(12) United States Patent
Fukuma et al.

(10) Patent No.: US 9,013,884 B2
(45) Date of Patent: Apr. 21, 2015

(54) DISPLAY, ELECTRONIC UNIT, AND SUPPORTING SUBSTRATE

(75) Inventors: Yohei Fukuma, Chiba (JP); Masahiro Kinoshita, Aichi (JP); Mitsuhiro Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 13/608,028

(22) Filed: Sep. 10, 2012

(65) Prior Publication Data

US 2013/0070431 A1   Mar. 21, 2013

(30) Foreign Application Priority Data

Sep. 21, 2011   (JP) .................................. 2011-205986

(51) Int. Cl.
    *H05K 1/00*         (2006.01)
    *H01L 21/56*       (2006.01)
    *G06F 1/16*         (2006.01)

(52) U.S. Cl.
    CPC .................................. *G06F 1/1652* (2013.01)

(58) Field of Classification Search
    CPC ...... G06F 1/1641; G06F 1/1652; G06F 9/301
    USPC .......................................... 361/749; 438/156
    See application file for complete search history.

(56) References Cited

U.S. PATENT DOCUMENTS

| | | | |
|---|---|---|---|
| 8,837,126 B2 * | 9/2014 | Cho et al. ................. | 361/679.01 |
| 2004/0112632 A1 * | 6/2004 | Michiwaki et al. ........... | 174/254 |
| 2010/0164888 A1 * | 7/2010 | Okumura et al. .............. | 345/173 |
| 2010/0232100 A1 * | 9/2010 | Fukuma et al. .......... | 361/679.01 |
| 2011/0095999 A1 * | 4/2011 | Hayton ......................... | 345/173 |
| 2011/0198111 A1 * | 8/2011 | Naganuma et al. ........... | 174/254 |
| 2014/0029171 A1 * | 1/2014 | Lee ........................... | 361/679.01 |
| 2014/0043244 A1 * | 2/2014 | van Lieshout et al. ........ | 345/173 |
| 2014/0078046 A1 * | 3/2014 | Seo et al. ...................... | 345/156 |
| 2014/0101560 A1 * | 4/2014 | Kwak et al. ................... | 715/738 |

FOREIGN PATENT DOCUMENTS

| JP | 2004185331 A | * | 7/2004 |
|---|---|---|---|
| JP | 2010-157060 A | | 7/2010 |
| JP | 2010-218102 A | | 9/2010 |

* cited by examiner

*Primary Examiner* — Jeremy C Norris
*Assistant Examiner* — Nathan Milakovich
(74) *Attorney, Agent, or Firm* — Wolf, Greenfield & Sacks, P.C.

(57) ABSTRACT

There are provided a display and an electronic unit that realize excellent operability when display content is switched based on a user operation associated with a variation in a physical form, and a supporting substrate employed in such a display. The display includes: a supporting substrate having flexibility; and a display section provided on the supporting substrate. The flexibility of the supporting substrate gradually increases toward an edge in a first region provided at at least a portion on a side of the edge in a plane thereof.

20 Claims, 13 Drawing Sheets

DISPLAY, ELECTRONIC UNIT, AND SUPPORTING SUBSTRATE

CROSS REFERENCE TO RELATED APPLICATIONS

This application claims priority to Japanese Priority Patent Application JP 2011-205986, filed in the Japan Patent Office on Sep. 21, 2011, which is herein incorporated by reference in its entirety.

BACKGROUND

The present disclosure relates to a thin and flexible display such as a so-called electronic paper.

In recent years, manufacturers have developed various kinds of ultra-thin displays called electronic paper (e-paper) (for example, Japanese Unexamined Patent Application Publication Nos. 2010-218102 and 2010-157060). For example, Japanese Unexamined Patent Application Publication No. 2010-218102 proposes a so-called electronic book (e-book) utilizing such an ultra-thin display as a book.

SUMMARY

Since the above-mentioned displays are thin and highly flexible, it is possible to physically bend and twist the above-mentioned displays. This makes it possible to realize various kinds of user interfaces such as those in which a sensor configured to detect bending by a user and the like is incorporated to switch display content in response to such a user operation. In such displays, in order to enhance operability, it is desirable that a correlation between a user operation and display content to be actually changed be high, and the user operation and the display content to be actually changed be easily and intuitively connected.

It is desirable to provide a display and an electronic unit that realize excellent operability when display content is switched based on a user operation associated with a variation in a physical form, and a supporting substrate employed in such a display.

According to an embodiment of the present disclosure, there is provided a display including a supporting substrate having flexibility; and a display section provided on the supporting substrate. The flexibility of the supporting substrate gradually increases toward an edge in a first region provided at at least a portion on a side of the edge in a plane thereof.

According to an embodiment of the present disclosure, there is provided an electronic unit with a display. The display includes a supporting substrate having flexibility; and a display section provided on the supporting substrate. The flexibility of the supporting substrate gradually increases toward an edge in a first region provided at at least a portion on a side of the edge in a plane thereof.

According to an embodiment of the present disclosure, there is provided a supporting substrate configured to support a display section and having flexibility. The flexibility of the supporting substrate gradually increases toward an edge in a first region provided at at least a portion on a side of the edge in a plane thereof.

In the display and the electronic unit according to the embodiments of the present disclosure, since the supporting substrate has flexibility, and in the first region provided at at least a portion on a side of an edge in a plane thereof, the flexibility of the supporting substrate gradually increases toward the edge, a user allowed to bend and twist a local portion on the edge side of the whole display with ease.

According to the display and the electronic unit according to the embodiments of the present disclosure, since the supporting substrate has flexibility, and in the first region provided at at least a portion on a side of an edge in a plane thereof, the flexibility of the supporting substrate gradually increases toward the edge, a user is allowed to readily bend and twist a local portion on the edge side of the whole display. Consequently, when display content is switched based on a user operation associated with a variation in a physical form, excellent operability is realized.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B illustrate an opened state and a closed state (folded state), respectively.

DETAILED DESCRIPTION

Referring to the figures, an embodiment of the present disclosure will be described in detail. Description will be given in the following order.

1. Embodiment (exemplary electronic book including supporting substrate having predetermined thickness variation)
2. Modification (another exemplary layout of first region (thin-walled portion) of supporting substrate)

Embodiment

Figure 1A:
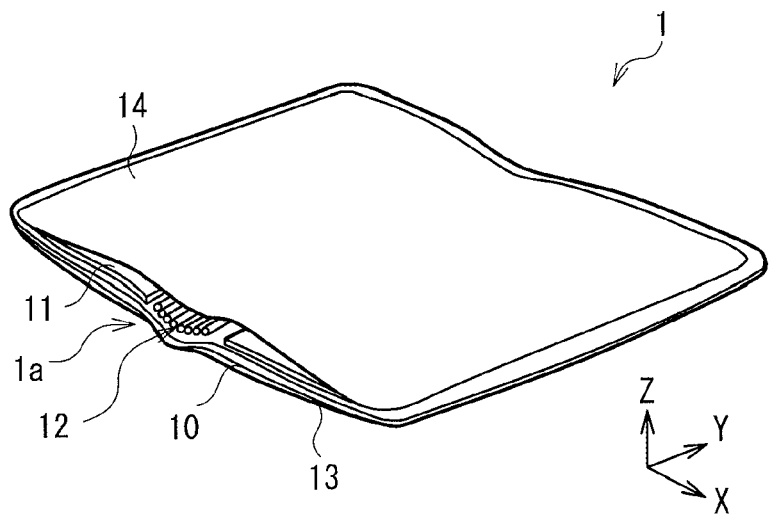
FIGS. 1A and 1B are perspective views each schematically showing a model configuration of a display (electronic book) according to an embodiment of the present disclosure.
Figure 1B:
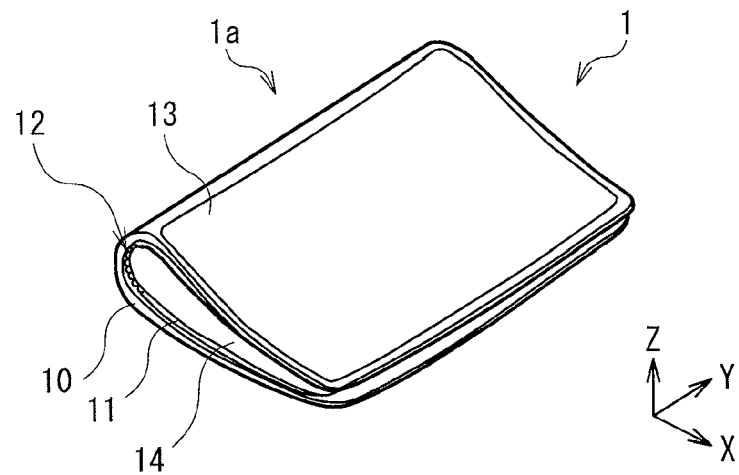
Figure 2:
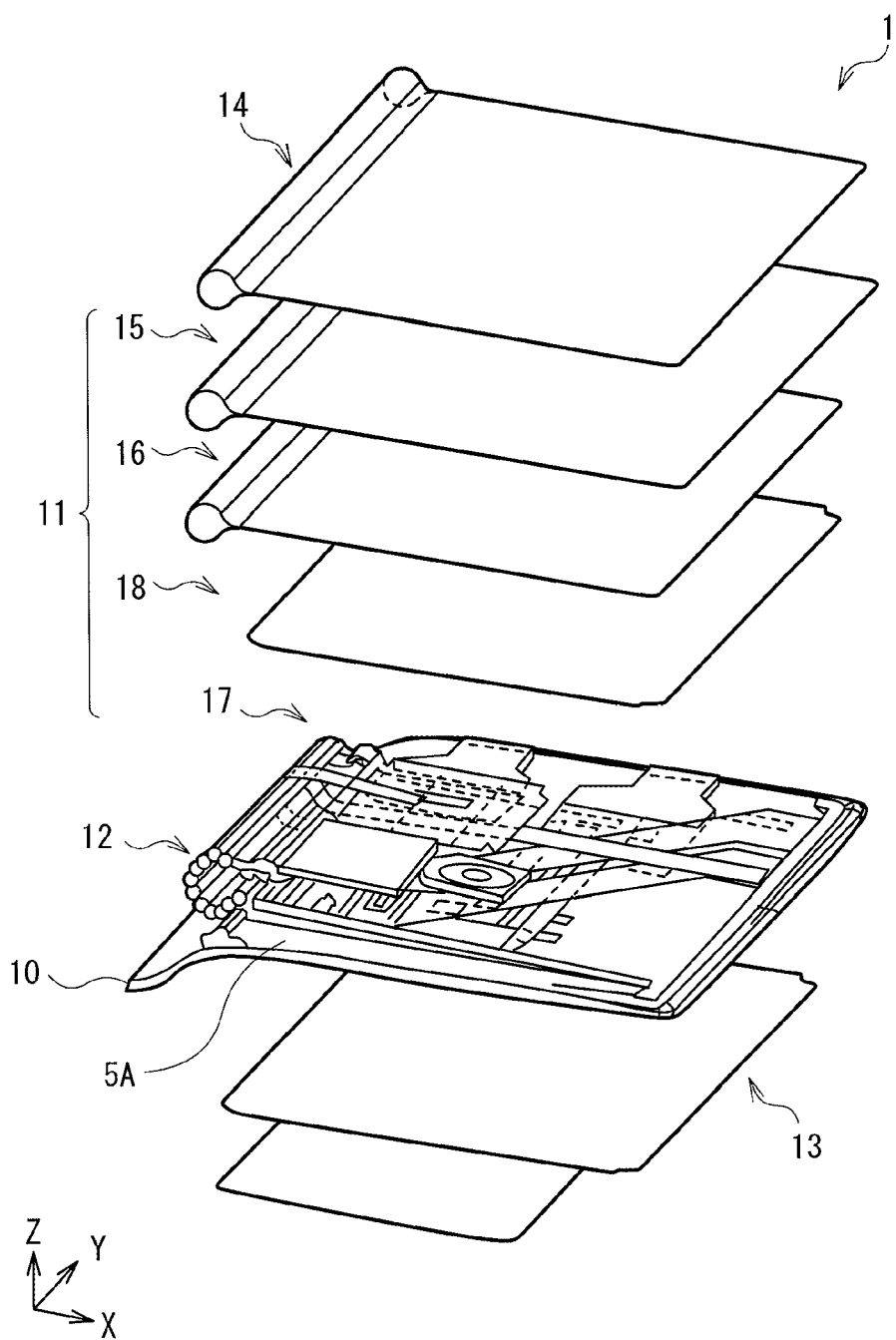
FIG. 2 is an exploded perspective view of the display illustrated in FIGS. 1A and 1B.
Figure 3:
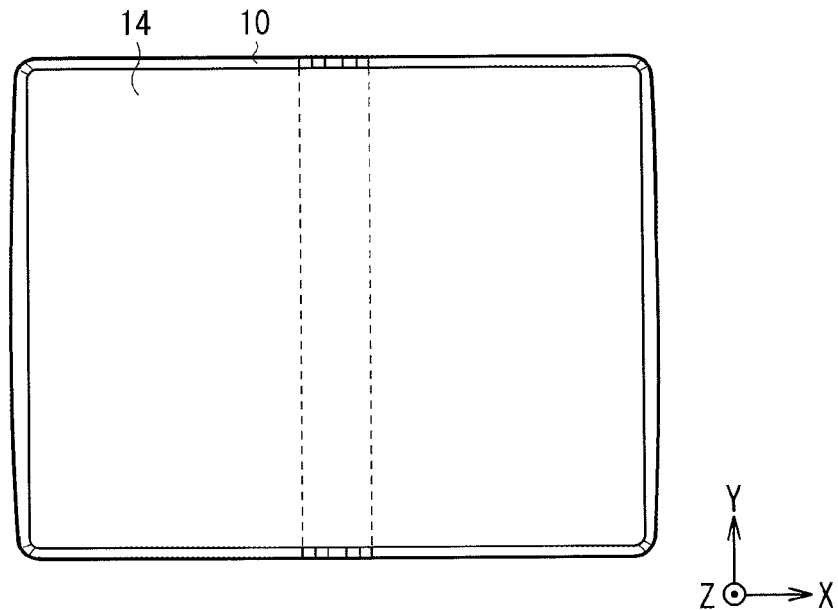
FIG. 3 is a plan view of the display illustrated in FIGS. 1A and 1B.
Figure 4:
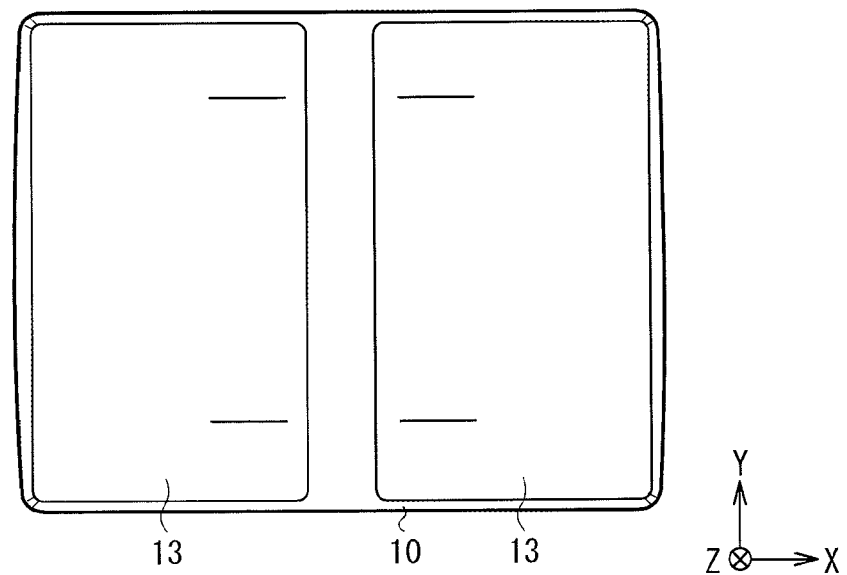
FIG. 4 is a bottom view of the display illustrated in FIGS. 1A and 1B.
Figure 5:
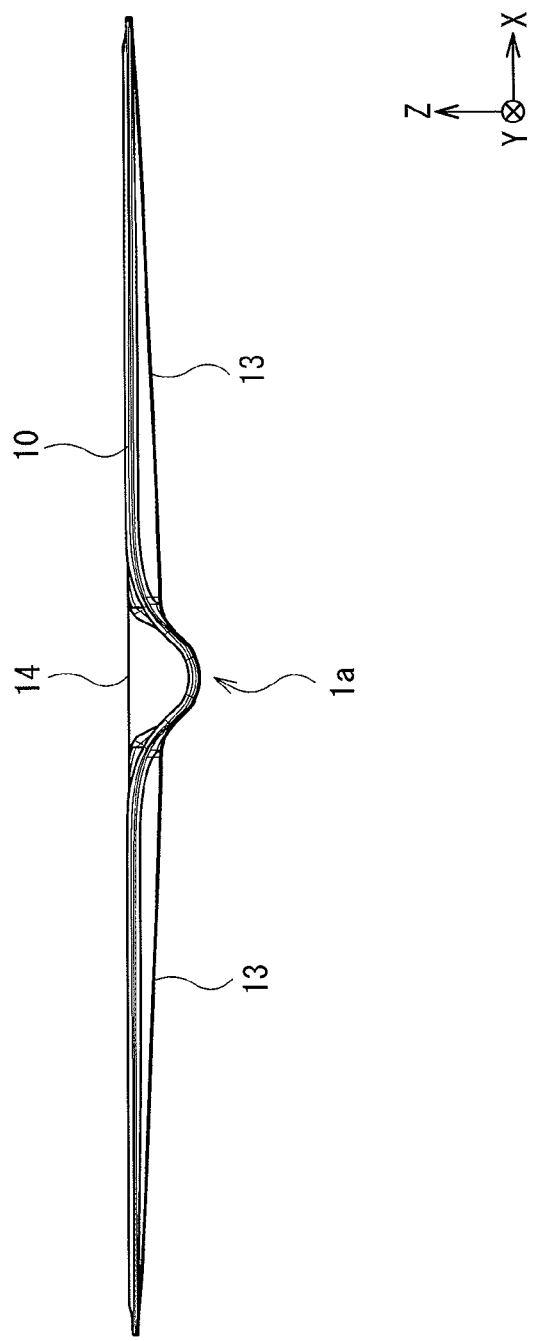
FIG. 5 is a front view (or a back view) of the display illustrated in FIGS. 1A and 1B.
Figure 6:
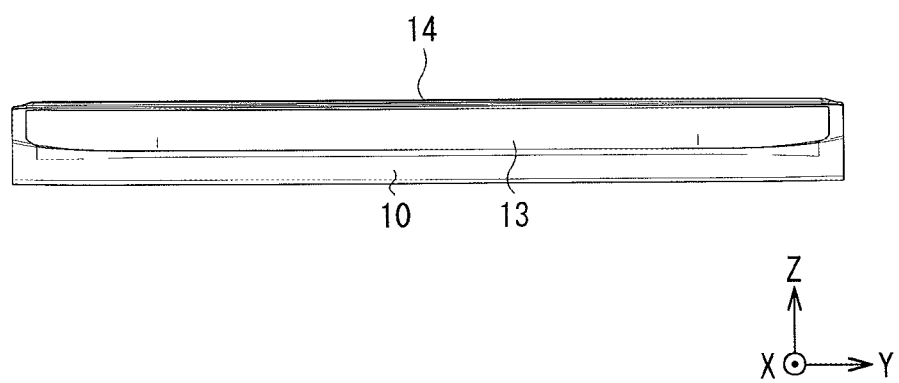
FIG. 6 is a side view (right side view, left side view) of the display illustrated in FIGS. 1A and 1B.

FIGS. 1A and 1B each schematically show a perspective configuration of a display (electronic book 1) according to an embodiment of the present disclosure. FIG. 2 is an exploded perspective view of the electronic book 1 (one side portion). FIG. 3 is a plan view of the electronic book 1, FIG. 4 is a bottom view, FIG. 5 is a front view (similar to a back view), and FIG. 6 is a right side view (similar to a left side view). It should be noted that, a hinge section 12 is not shown in FIG. 3 to FIG. 6.

The electronic book 1 is a thin and flexible display formed with use of a flexible material as a component. In the electronic book 1, the whole unit may be closed (folded) or opened as is the case with a real book made by putting together a plurality of papers (pages). A user is allowed to browse content (a page or the like of a book, for example) displayed on the electronic book 1 with a feeling like actually reading a book.

[Structure]

The electronic book 1 is provided with, on a supporting substrate 10, a laminated body 11 including a display section 15, and, at a portion corresponding to a "spine" (spine 1a) of a book, the hinge section 12. On the bottom face side (a side that faces outside in a closed state) of the electronic book 1, a cover 13 is provided, and the top face side (a side that faces inside in a closed state) thereof is covered with a protect sheet 14.

As a base material of the electronic book 1, the supporting substrate 10 supports the laminated body 11 and has flexibility. The flexibility of the supporting substrate 10 differs among regions thereof. In the present embodiment, the thickness of the supporting substrate 10 varies in a plane thereof, and this results in the variation of flexibility. Detailed configuration of the supporting substrate 10 will be described later.

(Laminated Body 11)

As illustrated in FIG. 2, for example, the laminated body 11 has a structure in which a system board layer 17, a driving circuit section 18, a detection section 16, and the display section 15 are laminated in order from the supporting substrate 10 side. Each of these components is configured of a flexible material, and flexibility is obtained when these components are laminated. It is to be noted that, while an exemplary case where the laminated body 11 is provided on two faces, a left side face and a right side face, of the electronic book 1 in an opened state is illustrated in the present embodiment, the laminated body 11 may be provided on only one of the left side face and the right side face.

The display section 15 is a display panel that displays an image based on an image signal, and for example, has a structure in which an organic electro luminescence (EL) device, a liquid crystal display device, an electrophoretic device, or the like is sandwiched by a resin film of a plastic or the like.

The detection section 16 detects an operation (operation performed mainly along a Z direction) of bending, pushingly moving, or the like by a user, and specifically, includes a bending sensor 16b. The bending sensor 16b is configured of, for example, an acceleration sensor, a force sensor, a pressure sensor, a deformation sensor, a gyro sensor, or the like.

The detection section 16 also includes, in addition to the bending sensor 16b, a location sensor 16a, and is capable of detecting touch input (input using a stylus, finger(s), hand(s), or the like) by a user. The location sensor 16a detects a position touched by a user as a two-dimensional position coordinate of an X direction and a Y direction. Examples of the location sensor 16a include a pressure-sensitive sensor, a two-dimensional tracking sensor, a two-dimensional touch sensor, a mesh sensor, and one utilizing a capacitance system. It should be noted that, the location sensor 16a is preferably provided in an upper layer of the display section 15. With sensing in three axis directions of X, Y, and Z using the location sensor 16a and the bending sensor 16b, it is possible to detect a location, a degree, and the like of a bending operation by a user. It should be noted that, the configuration of the detection section 16 is not limited to the combination of the location sensor 16a and the bending sensor 16b, and any three-axis sensors may be used.

In the system board layer 17, for example, a system board on which electronic parts are mounted, a hard disk drive (HDD), a cooling fan, and the like are disposed. On the system board, for example, electronic parts including a central processing unit (CPU), a main memory, a chipset, control circuits for various kinds of driving, and the like are mounted. The hard disk drive is connected to a connector terminal of the system board, and is configured to include therein a hard disk. The hard disk drive reads and writes information in the hard disk. The cooling fan cools a CPU mounted on the system board and other heating devices.

The driving circuit section 18 is a circuit section including a thin film transistor (TFT) configured to drive each of the display section 15 and the detection section 16. Examples of the TFT include an organic TFT.

The cover 13 is an exterior member of the electronic book 1, and is configured of a flexible resin film. In the present embodiment, the cover 13 is attached to the supporting substrate 10 in such a manner as not to cover the whole surface of the supporting substrate 10, thereby exposing a raised portion (a portion near the vertex of the fold) of the spine 1a, for example. In other words, as illustrated in FIG. 5, a pair of the covers 13 is provided so as to project to both sides from a tapered face of the spine 1a of the supporting substrate 10. Each cover 13 is bonded at a part of a region thereof facing the supporting substrate 10. Specifically, each cover 13 is bonded at only both end portions thereof corresponding to two sides along the Y direction, and is not bonded to the supporting substrate 10 in a region between the both end portions. With this configuration, the cover 13 is provided in such a manner that an appropriate tension is maintained (or that excessive slackness is prevented) in a state where the electronic book 1 is opened, and the supporting substrate 10 is not folded but stretched (or in a state where the surface of the supporting substrate 10 has an angle of approximately 180 degrees).

The protect sheet 14 protects the display section 15, and forms a display face of the electronic book 1. The protect sheet 14 is bonded to the supporting substrate 10 so as to cover the whole surface thereof, and is configured of a flexible resin film having transparency for display light.

(Hinge Section 12)

The hinge section 12 is provided at a portion (second region D2 described later) corresponding to the spine 1a of the supporting substrate 10, and desirably, the hinge section 12 is a curvature restriction hinge capable of maintaining a predetermined curvature regardless of the folding angle of the supporting substrate 10 (or the electronic book 1), for example. An exemplary configuration of the hinge section 12 will be described below.

Figure 7:
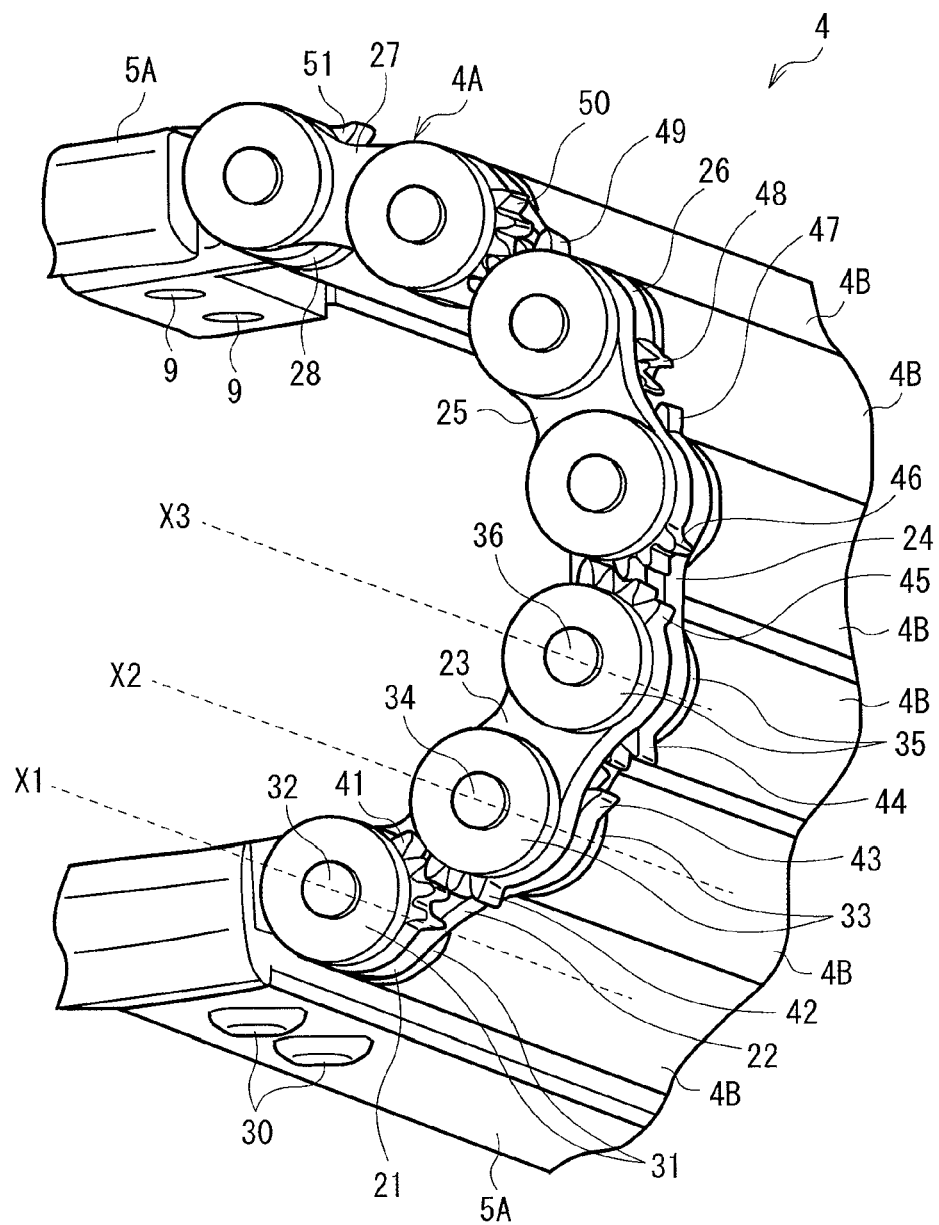
FIG. 7 is a view showing an exemplary configuration (articulated coupling mechanism) of a hinge section illustrated in FIGS. 1A and 1B.

FIG. 7 is an enlarged view of a part of the hinge section 12. Referring to FIG. 7, for example, the hinge section 12 includes an articulated coupling mechanism 4 at an end portion of a frame body 5A configured to fix the hinge section 12 on the supporting substrate 10. The articulated coupling mechanism 4 includes a plurality of pairs of coupling mechanisms 4A. Each pair of coupling mechanisms 4A face each other at both ends of the spine 1a of the electronic book 1 (both ends in the longitudinal direction of the second region D2). Each coupling mechanism 4A is fitted to a hollow coupling member 4B provided coaxially along the turning axis of the coupling mechanism 4A. It is to be noted that, for simplification, FIG. 7 illustrates only one of the pair of articulated coupling mechanisms 4A. Coupling plates 21 to 28 turnably coupled to one another are attached to the coupling mechanisms 4A.

The coupling plate 21 is screw-fixed to the frame body 5A by a screw 30. The coupling plate 21 includes a turning axis X1. The axis diameter of the coupling plate 21 around the turning axis X1 is 3 mm to 5 mm for example. The coupling plate 22 has turning axes X1 and X2 at both end portions thereof, and overlaps an internal side of the coupling plate 21 with the turning axis X1 of the coupling plate 21 and the turning axis X1 of the coupling plate 22 being matched. The coupling plate 21 and the coupling plate 22 are turnably coupled together by a coupling pin 32 through a pair of rings 31 provided on external sides of the coupling plate 21 and the coupling plate 22. The coupling plates 23 to 27 each have a form similar to that of the coupling plate 22.

The coupling plate 23 has turning axes X2 and X3 at both end portions thereof. The coupling plate 23 overlaps an external side of the coupling plate 22 with the turning axis X2 of the coupling plate 22 and the turning axis X2 of the coupling plate 23 being matched. The coupling plate 22 and the coupling plate 23 are turnably coupled together by a coupling pin 34 through a pair of rings 33 provided on external sides of the coupling plate 22 and the coupling plate 23. The coupling plates 24 to 28 are also turnably coupled in a similar manner. As described above, the coupling plates 21, 23, 25, and 27 are coupled to the coupling plates 22, 24, 26, and 28 so as to be located outward of the coupling plates 22, 24, 26, and 28. In other words, in the articulated coupling mechanism 4A, the coupling plates 21 to 28 are coupled in a staggered manner to thus be arranged in two rows. The coupling plates 21, 23, 25, and 27 in the first row are arranged on an external side of the width direction of the main body portion 3, and the coupling plates 22, 24, 26, and 28 in the second row are arranged on an internal side of the width direction of the main body portion 3. It should be noted that the example in which the rings 31, 33, and 35 are provided has been described, but such rings may not be arranged as appropriate. The articulated coupling mechanism 4 includes an interlock mechanism (gear) configured to interlock the coupling plates 21 to 28.

The coupling plate 21 includes a plurality of gears 41 on a circumferential surface along a turning direction thereof. The plurality of gears 41 protrudes toward the coupling plate 23 side. An external surface 41A of each of the gear 41 is chamfered. The coupling plate 23 includes gears 42 that engage with the gears 41 of the coupling plate 21, on a circumferential surface along a turning direction thereof. In other words, the coupling plates 21 and 23 that are adjacent to each other each have the circumferential surface along the turning direction, and the circumferential surfaces are formed with the gears 41 and 42 that are engaged with each other. Similarly, gears 43 of the coupling plate 22 and gears 44 of the coupling plate 24 are engaged with each other. Gears 45 of the coupling plate 23 and gears 46 of the coupling plate 25 are engaged with each other. Gears 47 of the coupling plate 24 and gears 48 of the coupling plate 26 are engaged with each other. Gears 49 of the coupling plate 25 and gears 50 of the coupling plate 27 are engaged with each other. Gears (not shown) of the coupling plate 26 and gears 51 of the coupling plate 28 are engaged with each other. These gears 41 to 51 function as an interlock mechanism and interlock the coupling plates 21 to 28.

By employing the articulated coupling mechanism 4 including the above-mentioned coupling mechanism 4A and the interlocking mechanism in the hinge section 12, it is possible to maintain a predetermined curvature of a curved shape of the spine 1a regardless of the folding angle (degree of opening) of the electronic book 1. In addition, it is possible to realize a smooth opening/closing operation without load. In the supporting substrate 10 described below, a portion abutting the hinge section 12 (a portion corresponding to the second region D2) is preliminarily formed to have a curved shape (a curved shape 10B described later) matching the curved shape of the hinge section 12.

(Supporting Substrate 10)

Figure 8:
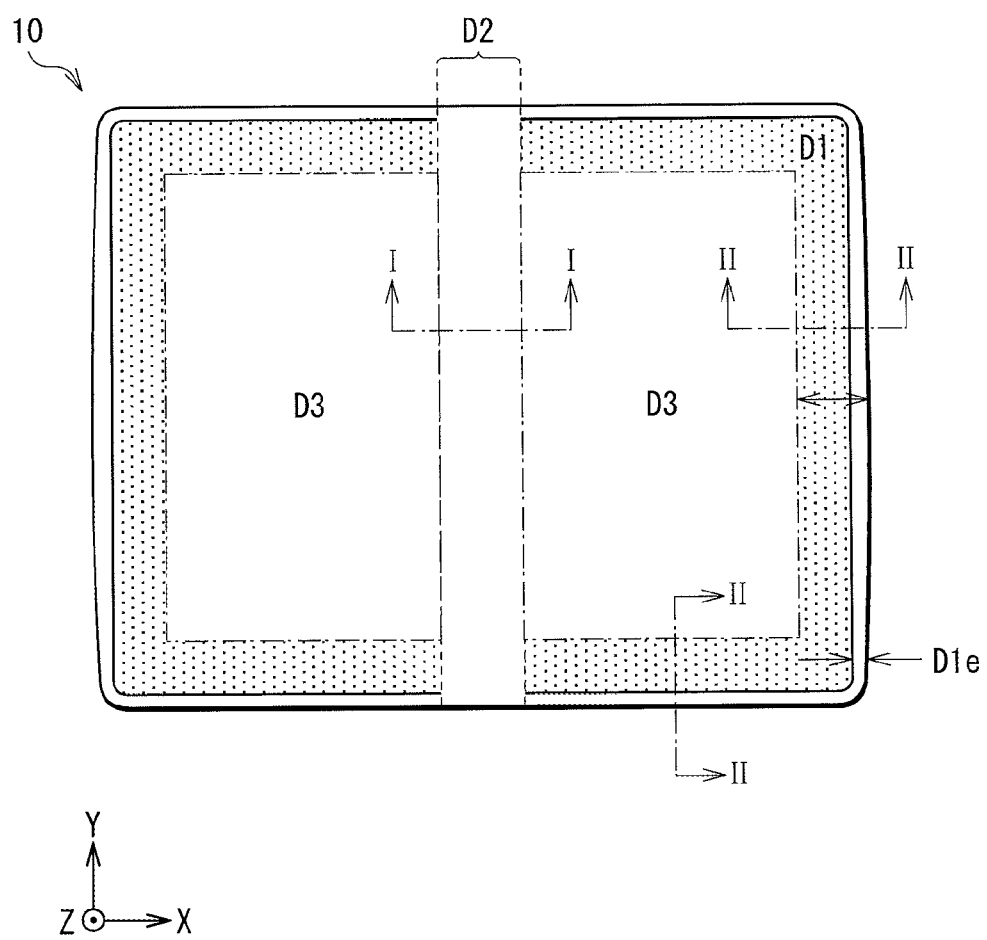
FIG. 8 is a schematic view showing region segmentation used to explain a thickness variation of a supporting substrate.

As described above, the thickness of the supporting substrate 10 varies in the plane thereof, and the supporting substrate 10 may be segmented into three main regions which are different in thickness (the first region D1, the second region D2, and a third region D3). Specifically, as illustrated in FIG. 8, a planar form (XY-plane form) of the supporting substrate 10 is a rectangular form, and the first region D1 corresponds to at least a part of a region on the edge side of the rectangular form (here, the whole edge region other than the portion overlapping the second region described later). The second region D2 is a region that extends so as to divide (in this instance, bisect) the rectangular planar form, and corresponds to the spine 1a. The third region D3 is a region sandwiched (surrounded) by the first region D1 and the second region D2.

Figure 9:
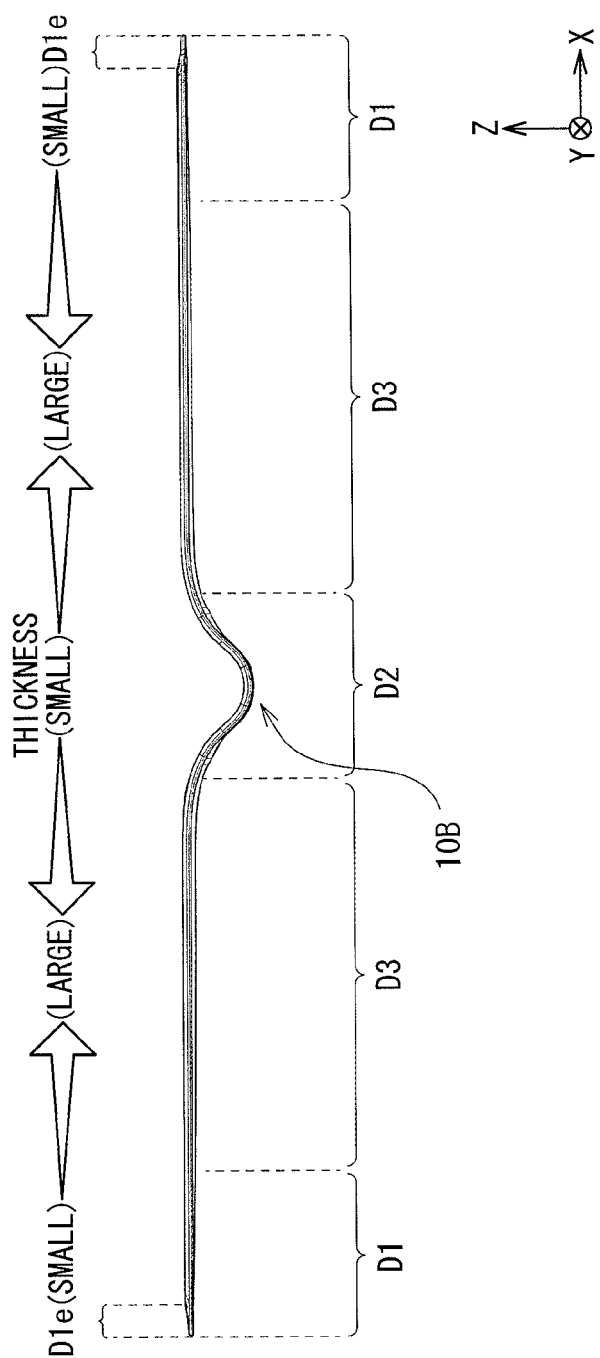
FIG. 9 schematically shows the thickness variation of the supporting substrate.
Figure 10A:
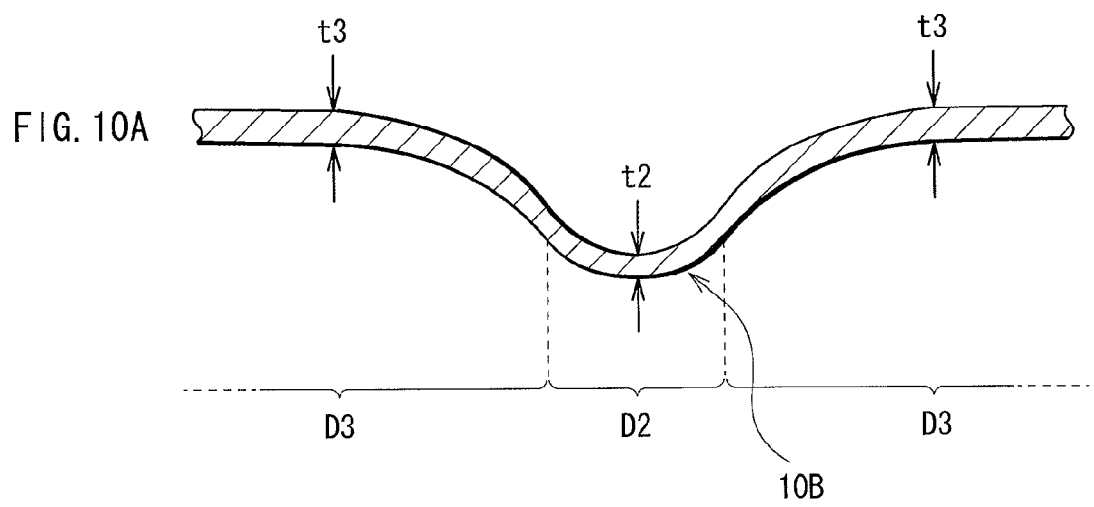
FIGS. 10A and 10B are enlarged sectional views each showing a vicinity of a boundary between regions of the supporting substrate.
Figure 10B:
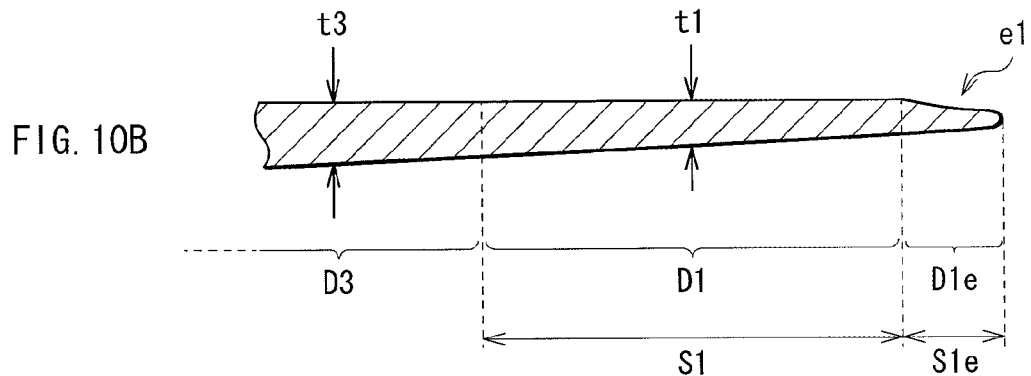

Specifically, in the first region D1, the second region D2, and the third region D3, the thickness is gradually increased from the second region D2 toward the third region D3, and is gradually decreased from the third region D3 toward the first region D1, as illustrated in FIG. 9. Here, FIGS. 10A and 10B each illustrate an enlarged view of a vicinity of the boundary between the regions. It is to be noted that, FIG. 10A is a sectional view taken along line I-I of FIG. 8, and FIG. 10B is a sectional view taken along line II-II of FIG. 8. As illustrated in FIG. 10A, in the second region D2, the thickness t2 thereof is smaller than the thickness t3 of the third region D3 adjacent to the second region D2 (t2<t3), and the thickness continuously (successively) varies from the second region D2 toward the third region D3. On the other hand, as illustrated in FIG. 10B, in the first region D1, the thickness t1 is smaller than the thickness t3 of the third region D3 adjacent to the first region D1 (t1<t3), and the thickness continuously (successively) varies from the third region D3 toward the first region D1. For example, the thicknesses t1 to t3 are preferably set such that the thickness varies in a range smaller than several tens of millimeters, for example. The width S1 of the first region D1 is set at several millimeters or more, specifically about 50 mm for example.

As described above, while keeping a stepless and smooth curved form or planar form, the supporting substrate 10 has a structure in which the thickness is locally reduced in the first region D1 and the second region D2. It is to be noted that, in each of the first region D1, the second region D2, and the third region D3, the thickness may be gradually varied, or may be kept at a predetermined thickness.

It should be noted however that, more desirably, in the first region D1, a taper e1 whose thickness is reduced toward the edge is formed in a region D1e in the vicinity of the edge, as illustrated in FIG. 10B. The width S1e of the region D1e is about several millimeters or less, for example.

The supporting substrate 10 having the above-mentioned thickness variation is integrally formed with use of a thermoplastic elastomer or a heat-curable elastomer, for example. Examples of the elastomer include various kinds of resin materials based on urethane, styrene, olefin, ester, amide, silicone, or fluorine. Of these elastomers, in the case where a thermoplastic elastomer is used, it is possible to readily form the above-mentioned supporting substrate 10 by an injection molding method, for example.

(Functional Configuration)

Figure 11:
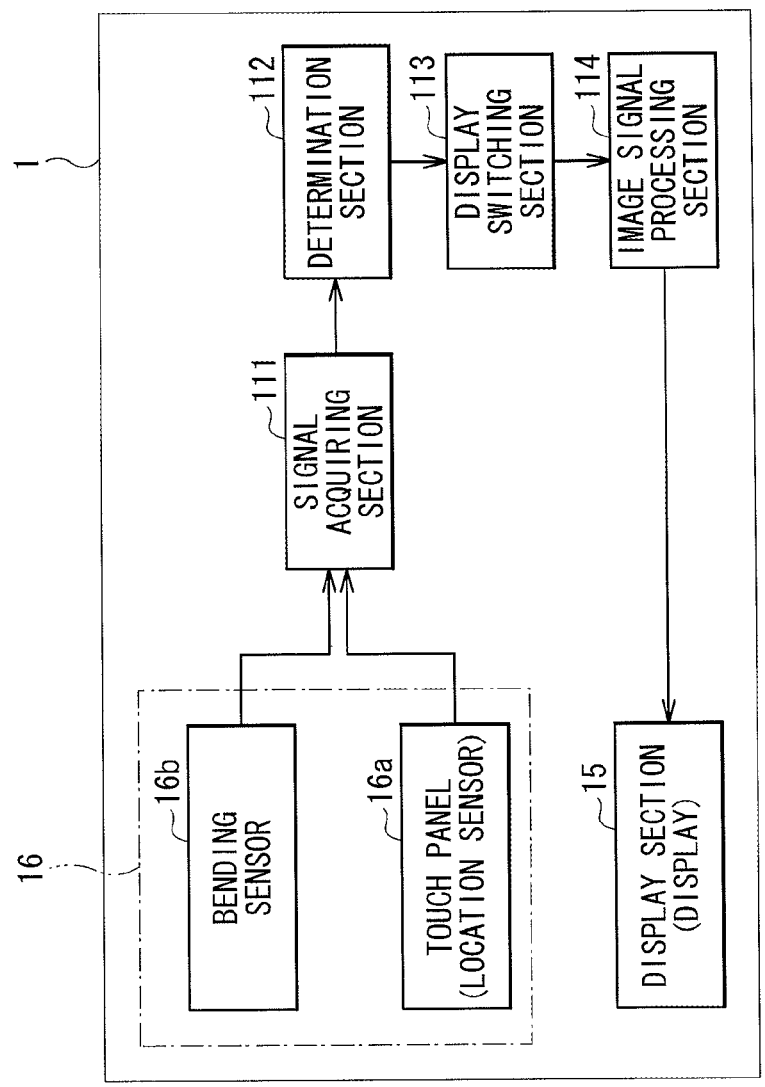
FIG. 11 is a functional block diagram of the display illustrated in FIGS. 1A and 1B.

Referring to FIG. 11, a functional configuration of the electronic book 1 will be described. The electronic book 1 includes a signal acquiring section 111, a determination section 112, a display switching section 113, and an image signal processing section 114. The signal acquiring section 111 is connected to the location sensor 16a and the bending sensor 16b provided as components.

The signal acquiring section 111 acquires a signal representing two-dimensional location information detected by the location sensor 16a. The signal acquiring section 111 also acquires a signal representing bend information (in a Z direction) detected by the bending sensor 16b.

The determination section 112 determines whether the electronic book 1 is bent at a local portion, based on a result of a detection by the sensors.

The display switching section 113 switches display content of the display section 15, based on a result of a detection by the sensors. Specifically, when the determination section 112 determines that a predetermined region of the electronic book 1 is bent, the display switching section 113 allows the display section 15 to display an image representing page turning (page flipping), scrolling, or the like.

The image signal processing section 114 generates an image (image signal) to be displayed on the display section 15. For example, the electronic book 1 displays a desired page of content downloaded through a network on the display section 15.

It is to be noted that, the function of each of the signal acquiring section 111, the determination section 112, the display switching section 113, and the image signal processing section 114 is realized by a dedicated control device or a processor (CPU) not shown in the figure configured to implement a program. A program and data representing a procedure to be implemented by a processor are stored in a hardware resource including storage devices such as a random access memory (RAM), a read only memory (ROM), and a hard disk drive (HDD).

[Function and Effect]

Since, in the electronic book 1, each of the supporting substrate 10, the laminated body 11, the cover 13, and the protect sheet 14 is made of a flexible material (has flexibility), and the spine 1a is provided with the predetermined hinge section 12, a user is allowed to open and close the electronic book 1 in the same manner as handling a real paper book. For example, in a state where the electronic book 1 is opened as illustrated in FIG. 1A, when an image (an image of one page of a book for example) is displayed on the display section 15, a user is allowed to read the page while holding the electronic book 1 with one hand or both hands, or while opening (putting) the electronic book 1 on a stand or the like.

As described above, in a state where certain content is displayed on the display section 15, when a user performs a predetermined action associated with a variation in the physical form of the electronic book 1, such an action is detected by the detection section 16, and the display switching section 113 switches display content. Specifically, in the case where the detection section 16 detects local deflection (bending (including torsion, pushingly moving, and the like)) of the supporting substrate 10 (the electronic book 1), the display switching section 113 switches display content, and displays content representing, for example, a page turning action or a scroll action. In other words, an inputting operation (such as a page turning action and a scroll action) by a user is perceived, and content corresponding to the perceived action is displayed (other page is displayed, other line is displayed, or the like).

Specifically, the signal acquiring section 111 acquires XY position coordinate information from the location sensor 16a, and acquires, from the bending sensor 16b, displacement in a Z direction as bend (deflection) information, and outputs the acquired information to the determination section 112. The determination section 112 specifies a location (a location contacted by finger (s) or the like) in the XY plane where an inputting action is performed by a user, based on the acquired XY position coordinate information, and determines whether the electronic book 1 is bent by the user, based on the acquired bend information. It is to be noted that, this determination is made by, for example, comparison with a threshold level of bending amount preliminarily held therein, and, for example, if the bending amount corresponding to the acquired bend information is smaller than the threshold level, then the determination result is "not being bent", whereas if the bending amount is greater than the threshold level, then the determination result is "being bent". In this way, inputting operations by a user as illustrated in FIGS. 12A to 12C are perceived.

Figure 12A:
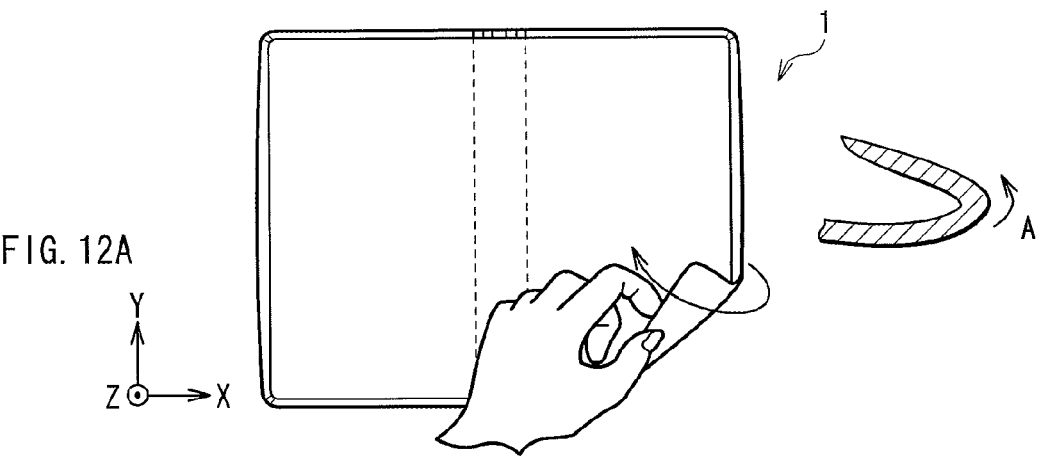
FIGS. 12A to 12C each schematically show an exemplary user operation.

In other words, it is possible to perceive an action A of bending an end region including corner portions and the like of the electronic book 1 to a near side as illustrated in FIG. 12A. Likewise, it is also possible to perceive an action B of bending and twisting an end portion of the electronic book 1 to a far side as illustrated in FIG. 12B, and an action C of moving and pushing (pushingly moving) an end portion of the electronic book 1 as illustrated in FIG. 12C. Among them, for example, the actions illustrated in FIGS. 12A and 12B are actions generally performed when a page is turned (flipped). On the other hand, the action illustrated in FIG. 12C is one of actions generally performed when a user performs a scroll action. It is to be noted that, since the scroll operation entails movement in the XY plane, it is preferable to simultaneously determine whether the XY position coordinate is moving at the time of determining the bending state. It should be noted that, these actions are merely illustrative, and are representative examples of actions that are generally performed when a user turns (flips) a page of a book, or performs a scroll.

Figure 12B:
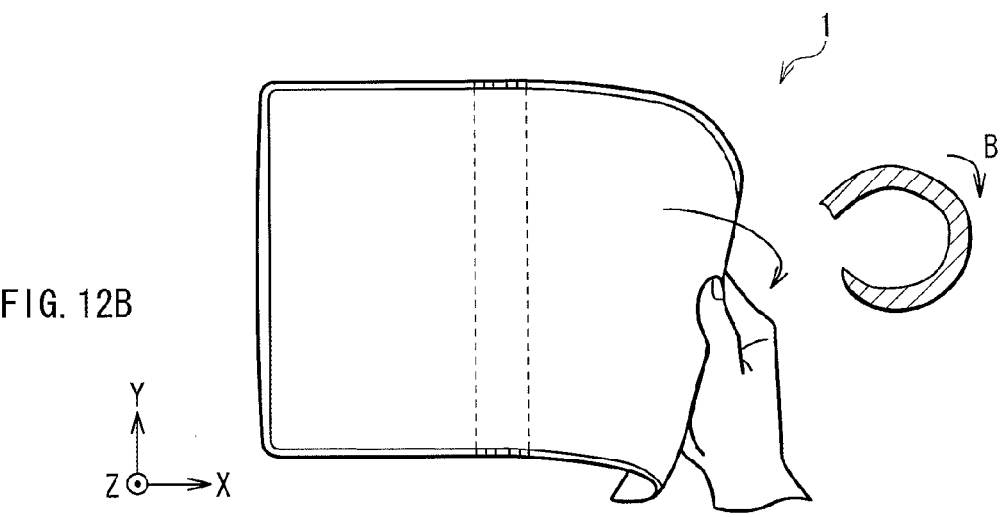
Figure 12C:
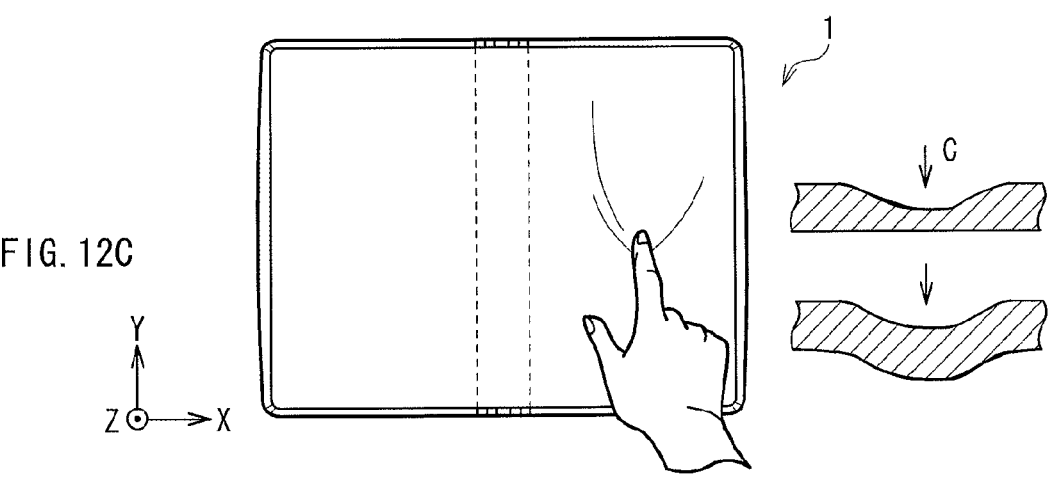

Then, if the user inputting operation perceived by the detection section 16 is the page turning actions illustrated in FIGS. 12A and 12B for example, then the display switching section 113 switches the display content to, for example, the content representing the previous page or the next page of the page that has been displayed. At this time, it is possible to perform a display in which a currently displayed page is instantly switched to the previous page or the next page on the display section 15, or it is also possible to perform a simulated display for displaying a state in which content of the next page gradually becomes visible on a flipped part, as in the case of flipping a page of a real book. On the other hand, if the user inputting operation perceived by the detection section 16 is the scroll action illustrated in FIG. 12C for example, then the display switching section 113 switches the display content to, for example, content representing previous line (s) or next line (s) of a predetermined line (or paragraph) of a page that has been displayed.

As described above, a user is allowed to perform an operation such as page turning and scrolling by the action of locally bending the electronic book 1. Specifically, since it is only necessary to operate the electronic book 1 in a similar way to a book in real space, a correlation between an inputting operation and display content to be actually changed is high, and the inputting operation and the display content to be actually changed is easily and intuitively connected for a user.

In particular, in the present embodiment, the supporting substrate 10 has a thickness variation, and locally-varied flexibility. Specifically, the first region D1 corresponding to the region on the edge side of the supporting substrate 10 is formed to be smaller in thickness than the third region D3 adjacent to the first region D1. With this configuration, at the time of the above-described inputting operation, a user is allowed to have a feeling of operation similar to a real book. In other words, when a user performs the actions of page turning, scrolling, and the like as illustrated in FIGS. 12A to 12C, since the first region D1 is formed to have a smaller thickness, it is easily bent like a page of a real paper. In addition, the higher flexibility increases the bending amount, and thus the detection sensitivity is improved. Consequently, when display content is switched based on a user operation associated with a variation in a physical form, excellent operability is realized.

In addition, at the portion corresponding to the spine 1a of the electronic book 1, the supporting substrate 10 is formed such that the second region D2 is smaller in thickness than the third region D3 adjacent to the second region D2, and further, the supporting substrate 10 is formed to have a curved shape matching the curved shape of the hinge section 12. This configuration allows a smooth opening/closing operation of the electronic book 1 while covering the hinge section 12 to maintain a design property.

Further, in the vicinity of the boundaries between the first region D1, the second region D2, and the third region D3 of the supporting substrate 10, there is no step, and the thickness thereof is continuously (successively) varied. Therefore, a smooth curved surface or plane is formed in whole, and thus it is possible to realize a form which is beautiful in terms of design and attains emotional attachment of a user.

Additionally, in the first region D1 of the supporting substrate 10, the taper e1 having an inclination in which the thickness is reduced toward the edge is provided in the vicinity of the edge, and thus it is possible to form an edge portion with a very small thickness. It is to be noted that, since the vicinity of the edge as mentioned above is typically not formed with a laminated body including the display section 15 and the like (or is exposed from the laminated body), there is no major problem even if it is formed to have a very small thickness. By making the edge portion of the supporting substrate 10 ultra-thin, a thickness closer to that of a paper is obtained, thereby improving operability.

As described hereinabove, since, in the present embodiment, the supporting substrate 10 has flexibility, and in the first region D1 on the end portion side in the plane thereof, the thickness thereof is gradually decreased toward the edge, a user is allowed to readily bend and twist a local portion on the end portion side of the whole electronic book 1. Consequently, when display content is switched based on a user operation associated with a variation in a physical form, excellent operability is realized.

[Modification]

Figure 13A:
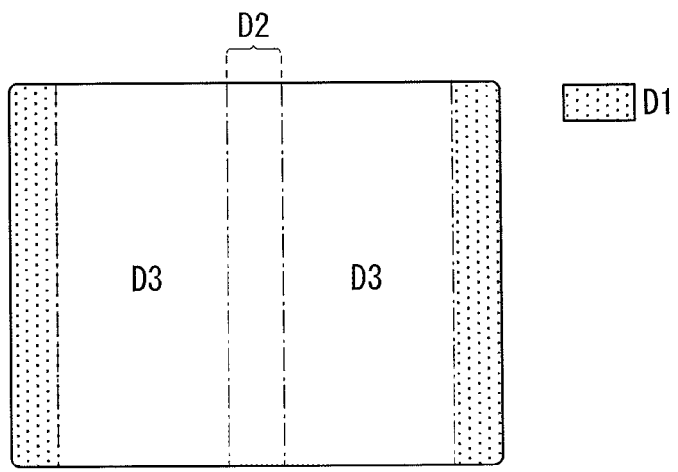
FIGS. 13A to 13C each schematically show another exemplary layout of a first region.
Figure 13B:
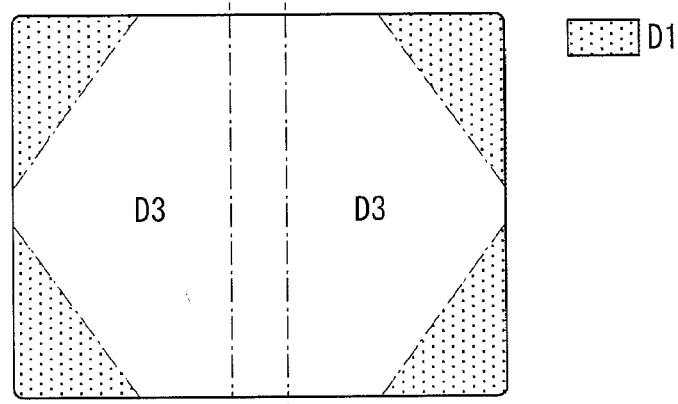
Figure 13C:
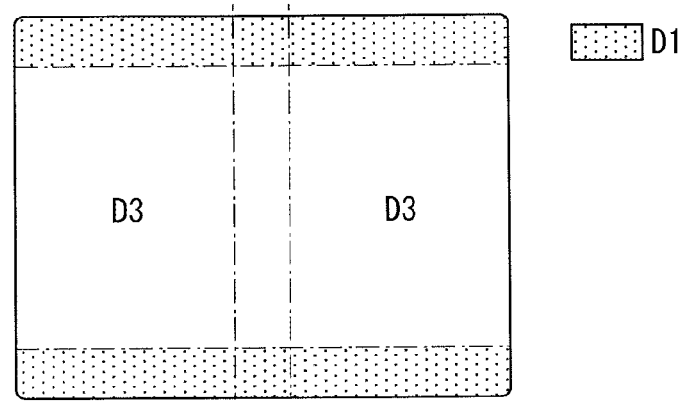

It is to be noted that, in the above-mentioned embodiment, the supporting substrate 10 is segmented into three regions in order to describe the thickness variation, the three regions are not limited to the above-described regions. For example, as illustrated in FIG. 13A, the first region D1 may be only regions along two short sides of the rectangular form, or as illustrated in FIG. 13B, may be regions corresponding to four corner portions of the rectangular form. Alternatively, as illustrated in FIG. 13C, the first region D1 may be only regions along two long sides of the rectangular form (except for the portion corresponding to the second region D2). It is to be noted that, although not shown in the figures, the first region D1 may not necessarily be provided symmetrically. In the case where the part to be used by a user for an inputting operation is specified in advance, it suffices to locally reduce the thickness of that part only as the first region D1.

Hereinabove, while description has been made based on the embodiment and the modification, the content of the present disclosure is not limited to the embodiment and so forth, and various modifications may be made. For example, while, in the above-mentioned embodiment and so forth, a configuration in which the thickness of the supporting substrate 10 is varied in the plane thereof is exemplified, if a configuration in which flexibility is varied in the plane thereof is secured, the thickness variation may be unnecessary. For example, by forming a supporting substrate with use of a material whose hardness varies from region to region, it is possible to obtain an effect substantially similar to that of the above-mentioned embodiment.

In addition, while, in the above-mentioned embodiment and so forth, a case in which the planar form of the supporting substrate 10 is rectangular is exemplified, the planar form of the supporting substrate 10 is not limited thereto, other forms such as a square form or other polygonal forms, a circular form, and an elliptical form may also be adopted.

Further, while, in the above-mentioned embodiment and so forth, a case in which the region corresponding to the spine 1a of the electronic book 1 (the second region D2 of the supporting substrate 10) is extendedly formed so as to bisect the supporting substrate 10 is exemplified, the form of the second region D2 is not limited thereto. For example, the second region D2 may be formed to extend to either a region closer to the right side or left side of the supporting substrate 10. In other words, such a configuration that one side of the supporting substrate is exposed from the other side in a folded state may also be adopted. In addition, the number of the second region D2 is not limited to one, and may be plural.

Additionally, while, in the above-mentioned embodiment and so forth, an electronic book is described as an example of the display or the electronic unit of the embodiment of present disclosure, the display or the electronic unit of the embodiment of the present disclosure may also be employed in other electronic units such as various kinds of mobile units (note type personal computers (PCs), mobile audio players, mobile phones, personal digital assistants (PDAs), and the like). In addition, the display or the electronic unit of the embodiment of the present disclosure may be used not only as a book reader, but also as any of other displays and electronic units with which a music player, a movie player, a picture viewer, a map application, a web browser, or the like may be browsed.

In addition, while the hinge section attached to a part of the supporting substrate is provided to the electronic book 1 so that the electronic book 1 is foldable, it is not absolutely necessary to provide the hinge section 12. If the supporting substrate 10 is so formed that the thickness thereof is locally reduced in the second region D2, then the second region D2 is readily bent compared to other portions, and therefore it is possible to open and close the electronic book with the second region serving as the spine portion thereof. It should be noted, however, that, the opening/closing action may be more smoothly performed when the hinge section 12 is adopted.

Figure 14A:
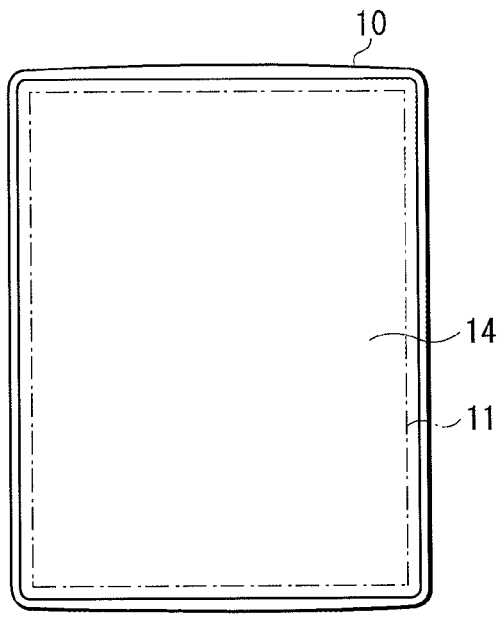
FIGS. 14A and 14B are schematic views used to explain other exemplary electronic units.
Figure 14B:
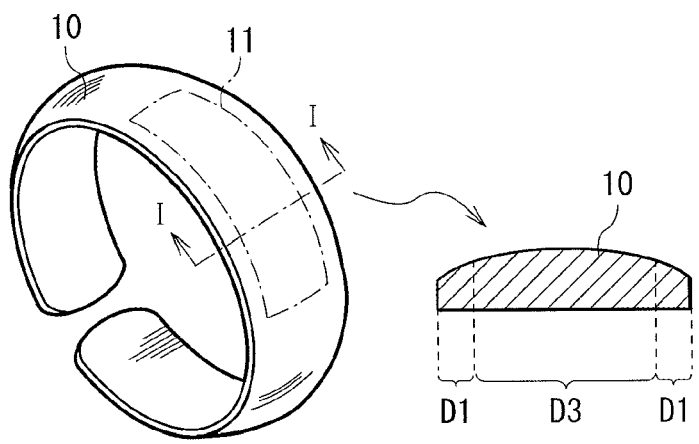

Further, the supporting substrate of the embodiment of the present disclosure does not necessarily need to be foldable, and as illustrated in FIG. 14A for example, a display or an electronic unit of so-called tablet-type in which the supporting substrate 10 is formed in a single plate form is also applicable. In this case, it is only necessary to form a structure in which the thickness of at least a part of an end portion is reduced relative to that of a center portion. In addition, as illustrated in FIG. 14B for example, the supporting substrate 10 may also be formed in a band shape attachable to arm or the like, and in this case, it is only necessary that, for example, an image is displayed on a side face thereof, and the thickness of both end portions in the width direction of the supporting substrate 10 is reduced (see a sectional view taken along line I-I). With this structure, when an inputting operation is performed in such a manner that both ends in the width direction of the supporting substrate 10 are held (pinched) by fingers, operability is improved. Further, although not shown in the figures, the above-described foldable, or tablet-type display or electronic unit may also be configured in such a manner that other units such as a keyboard may be connected thereto.

It is to be noted that the display and the electronic unit according to the embodiments of the present disclosure may be configured as described in the following (1) to (18).

(1) A display including:
a supporting substrate having flexibility; and
a display section provided on the supporting substrate, wherein
the flexibility of the supporting substrate gradually increases toward an edge in a first region provided at at least a portion on a side of the edge in a plane thereof.

(2) The display according to (1), wherein, in the first region, a thickness of the supporting substrate gradually decreases toward the edge.

(3) The display according to (1) or (2), wherein
the supporting substrate is foldable in whole when the supporting substrate is folded in a second region, the second region extending in one direction and dividing the plane, and
the second region is smaller in thickness than a nearby region thereof.

(4) The display according to (3), wherein
the supporting substrate includes a third region between the first region and the second region,
in a vicinity of a boundary between the second region and the third region, the thickness of the supporting substrate gradually increases from the second region toward the third region, and
in a vicinity of a boundary between the third region and the first region, the thickness of the supporting substrate gradually decreases from the third region toward the first region.

(5) The display according to any one of (1) to (4), wherein the supporting substrate includes, in a vicinity of the edge in the first region thereof, a taper whose thickness is decreased toward the edge to form an inclination.

(6) The display according to (3) or (4), further including a hinge section in contact with the second region of the supporting substrate.

(7) The display according to (6), wherein
the hinge section has a curved shape curved at a constant curvature regardless of an folding angle of the supporting substrate, and
the supporting substrate is formed to have a curved shape corresponding to the curved shape of the hinge section in the second region.

(8) The display according to any one of (1) to (7), wherein the supporting substrate is integrally formed.

(9) The display according to (8), wherein the supporting substrate is made of an elastomer.

(10) The display according to any one of (1) to (9), wherein
the supporting substrate has a planar form of a square form, and
the first region is a region corresponding to one or more sides of the square form.

(11) The display according to any one of (1) to (10), wherein
the supporting substrate has a planar form of a square form, and
the first region is a region corresponding to one or more corner portions of the square form.

(12) The display according to any one of (3), (4), and (6), wherein
the supporting substrate has a planar form of a square form, and
the second region is a region which is extendedly formed to bisect the square form.

(13) The display according to any one of (1) to (12), further including a detection section laminated on the supporting substrate together with the display section and configured to detect a local deflection of the supporting substrate.

(14) The display according to (13), further including a display switching section configured to switch content displayed on the display section, based on a result of a detection by the detection section, wherein
the display switching section performs an image display corresponding to page turning or scrolling on the display section when the detection section has detected a deflection in the first region of the supporting substrate.

(15) The display according to any one of (1) to (14), wherein the display section includes an organic electroluminescence device, a liquid crystal device, or an electrophoretic device.

(16) The display according to any one of (1) to (15), further including an organic thin film transistor as a drive device of the display section on the supporting substrate.

(17) An electronic unit with a display, the display including:
a supporting substrate having flexibility; and
a display section provided on the supporting substrate, wherein
the flexibility of the supporting substrate gradually increases toward an edge in a first region provided at at least a portion on a side of the edge in a plane thereof.

(18) A supporting substrate configured to support a display section and having flexibility, the flexibility of the supporting substrate gradually increasing toward an edge in a first region provided at at least a portion on a side of the edge in a plane thereof.

The present disclosure contains subject matter related to that disclosed in Japanese Priority Patent Application JP 2011-205986 filed in the Japan Patent Office on Sep. 21, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A display comprising:
a supporting substrate having flexibility, the supporting substrate comprising a first region that extends to an edge of the supporting substrate; and
a display section provided on the supporting substrate in at least a first portion of the first region, wherein
the flexibility of the supporting substrate gradually increases toward the edge in at least a second portion of the first region, and the first portion and the second portion at least partially overlap.

2. The display according to claim 1, wherein, in the first region, a thickness of the supporting substrate gradually decreases toward the edge.

3. The display according to claim 2, wherein
the supporting substrate is foldable in whole when the supporting substrate is folded in a second region, the second region extending in one direction and dividing the supporting substrate, and
the second region is smaller in thickness than a nearby region of the supporting substrate.

4. The display according to claim 3, wherein
the supporting substrate includes a third region between the first region and the second region,
in a vicinity of a boundary between the second region and the third region, the thickness of the supporting substrate gradually increases from the second region toward the third region, and
in a vicinity of a boundary between the third region and the first region, the thickness of the supporting substrate gradually decreases from the third region toward the first region.

5. The display according to claim 1, wherein the supporting substrate includes, in a vicinity of the edge in the first region thereof, a taper whose thickness is decreased toward the edge to form an inclination.

6. The display according to claim 3, further comprising a hinge section in contact with the second region of the supporting substrate.

7. The display according to claim 6, wherein
the hinge section has a curved shape curved at a constant curvature regardless of a folding angle of the supporting substrate, and
the supporting substrate is formed to have a curved shape corresponding to the curved shape of the hinge section in the second region.

8. The display according to claim 1, wherein the supporting substrate is integrally formed.

9. The display according to claim 8, wherein the supporting substrate is made of an elastomer.

10. The display according to claim 1, wherein
the supporting substrate has a rectangular shape, and
the first region is a region corresponding to one or more sides of the rectangular shape.

11. The display according to claim 1, wherein
the supporting substrate has a rectangular shape, and
the first region is a region corresponding to one or more corner portions of the rectangular shape.

12. The display according to claim 3, wherein
the supporting substrate has a rectangular shape, and
the second region is a region which is extendedly formed to bisect the rectangular shape.

13. The display according to claim 1, further comprising a detection section laminated on the supporting substrate together with the display section and configured to detect a local deflection of the supporting substrate.

14. The display according to claim 13, further comprising a display switching section configured to switch content displayed on the display section, based on a result of a detection by the detection section, wherein
the display switching section performs an image display corresponding to page turning or scrolling on the display section when the detection section has detected a deflection in the first region of the supporting substrate.

15. The display according to claim 1, wherein the display section includes an organic electroluminescence device, a liquid crystal device, or an electrophoretic device.

16. The display according to claim 1, further comprising an organic thin film transistor as a drive device of the display section on the supporting substrate.

17. An electronic unit with a display, the display comprising:
a supporting substrate having flexibility, the supporting substrate comprising a first region that extends to an edge of the supporting substrate; and
a display section provided on the supporting substrate in at least a first portion of the first region, wherein
the flexibility of the supporting substrate gradually increases toward the edge in at least a second portion of the first region, and the first portion and the second portion at least partially overlap.

18. A supporting substrate configured to support a display section and having flexibility, the supporting substrate comprising a first region that extends to an edge of the supporting substrate where at least a first portion of the first region is configured to support a display section, the flexibility of the supporting substrate gradually increasing toward the edge in at least a second portion of the first region, and the first portion and the second portion at least partially overlap.

19. The display according to claim 1, wherein the flexibility of the supporting substrate continuously increases toward the edge in at least a portion of the first region.

20. The display according to claim 10, wherein the rectangular shape is a square.

* * * * *